July 12, 1966 H. POPP 3,260,558
LINK BODY FOR ENDLESS TRACTION CHAINS OF
TRACK LAYING VEHICLES
Filed June 29, 1964 3 Sheets-Sheet 1

INVENTOR
HERMANN POPP

July 12, 1966  H. POPP  3,260,558
LINK BODY FOR ENDLESS TRACTION CHAINS OF
TRACK LAYING VEHICLES
Filed June 29, 1964  3 Sheets-Sheet 2
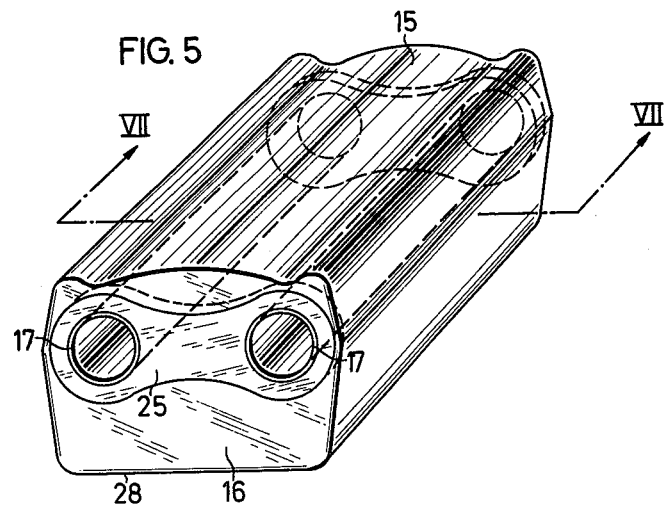
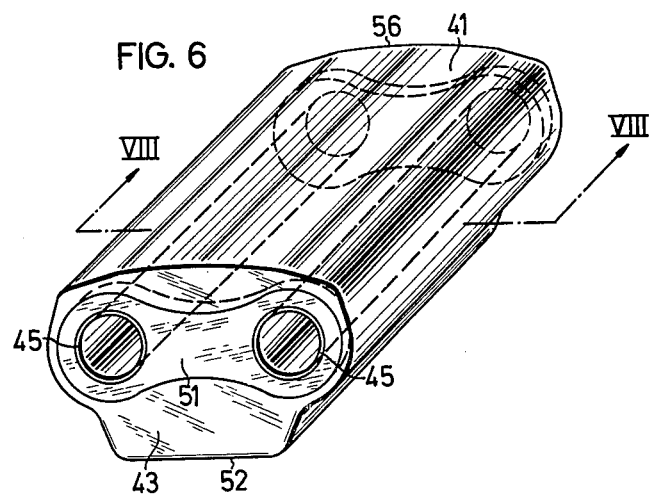
INVENTOR
HERMANN POPP

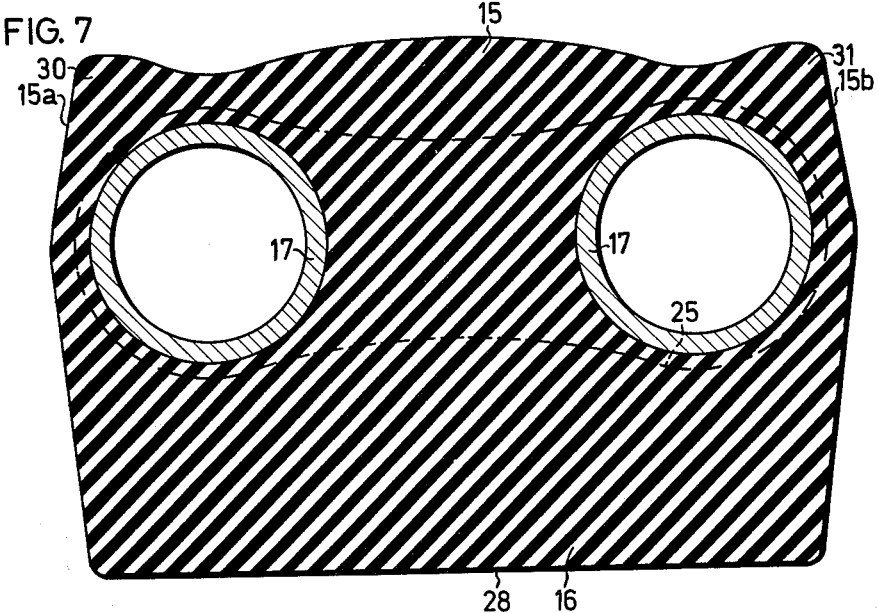
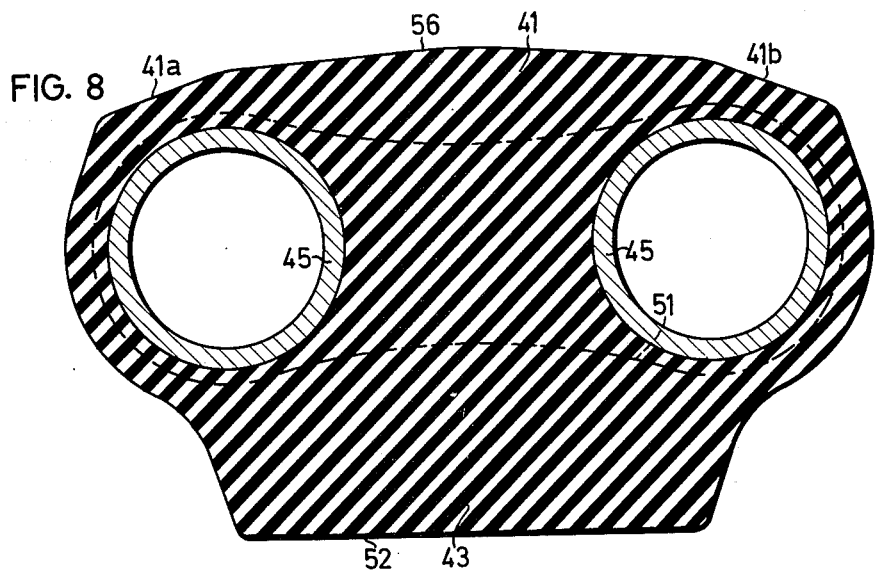

United States Patent Office 3,260,558
Patented July 12, 1966

3,260,558
LINK BODY FOR ENDLESS TRACTION CHAINS OF TRACK LAYING VEHICLES
Hermann Popp, Nurnberg, Germany, assignor to Diehl K.G., Remscheid, Germany
Filed June 29, 1964, Ser. No. 378,811
3 Claims. (Cl. 305—36)

The present invention relates to link bodies for endless traction chains of tracked vehicles.

Particularly for driving heavy vehicles, such as armored vehicles, cross-country, it is known to employ track laying drives. In this connection closed and driven endless traction chains are employed which were guided at both sides of the vehicle over driving and deviating wheels. These chains move over a plurality of serially arranged wheels which support the vehicle.

Such endless traction chains are built up of a plurality of interlinked or pivotally connected link bodies which consist primarily of two tubular members arranged transverse to the driving direction. These tubular members are at their end faces interconnected by spectacle-shaped fish plates so as to form a rigid link body. The link connection of the link bodies is effected by bolts arranged within said tubular members which in most instances, have rubber sleeves surrounding said bolts. These bolts have their ends protrude beyond the ends of the tubular members and are interconnected by connecting members which are relatively short with regard to the length of the link bodies. In view of the rubber inserts between the tubular members and the bolts, it is possible to pass the chain over the driving and deviating wheels.

The rigid link bodies are in most instances made of steel and, if desired, they may be welded together of the two tubular members and the two fish plates. However, if desired, they may also be cast of one piece, and forged.

In order to reduce the driving noise of such track laying drives and to prevent ice formation on the endless traction chains and the wheels, it is known to provide the running wheels at their circumference and also the individual chain members with an elastic cover, especially a rubber coating. Such rubber coating or rubber sleeving may, when the two tubular members are interconnected by metallic webs, be arranged only at that side which faces the ground or only on that side which faces the running wheels. With or without such a web, the rubber coating may also completely cover the double tubular body which primarily forms the chain link so that the chain links will rest upon the ground by means of an elastic section, and the running wheels provided with a rubber coating will roll on chain links having their inner side covered with rubber.

The chain links have heretofore been covered by an elastic noise absorbing material, especially rubber, in such a way that the sides facing the ground and the running wheels are plane and parallel to the plane passing through the axes of the tubular members of the chain link. Such an arrangement, however, especially when completely covered webless chain links are involved, have the following disadvantages. When the wheels roll on the endless traction chain or track resting on the ground, the wheels encounter a cover of varying yieldability. When the wheel center is above the tubular member of each chain link, this yieldability is relatively low. However, when the wheel center is between the two tubular members of the chain link, the said yieldability reaches its maximum. As a result thereof, the elastic cover of the chain link is subjected not only to an increased pulling stress but also a rather non-uniform stress is exerted upon the cover of the running wheels so that these parts are prematurely destroyed at higher speeds.

It is, therefore, an object of the present invention to provide link bodies for the endless traction chains of track laying vehicles, which will overcome the above-mentioned drawbacks.

It is another object of this invention to provide a link body for endless traction chains, which is covered by an elastic material and in which the elastic cover of the link body is subjected to a reduced stress.

It is still another object of this invention to provide a link body as set forth above which is so designed that it will be subjected to a more uniform stress, thereby permitting increased driving speeds.

These and other objects and advantages of the invention will appear more clearly from the following specification in connection with the accompanying drawings, in which:

FIGURE 5 is an isometric side view of a link body according to the invention as shown in FIGURE 2;

FIGURE 6 is an isometric side view of a link body according to the invention as shown in FIGURE 4;

FIGURE 7 is a cross sectional view as indicated by the line VII—VII of FIGURE 5;

FIGURE 8 is a cross sectional view as indicated by the line VIII—VIII of FIGURE 6.

The link body according to the present invention, which has at least that side thereof that faces the track wheel of the vehicle provided with an elastic cover, is characterized primarily in that the height of the plastic cover is, within its range of high yieldability, increased over its range of low yieldability in which it is directly supported by portions of the endless traction chain portions. When properly dimensioning the height of the plastic cover in the various serially arranged layers of the link body, the stress to which the cover of the track wheels will be subjected will be considerably reduced so that the life of the cover will be increased. Also, the stress exerted upon the link bodies of the chain will be more uniform which, in turn, permits an increase in the permissible load and in the driving speed.

Figure 1:
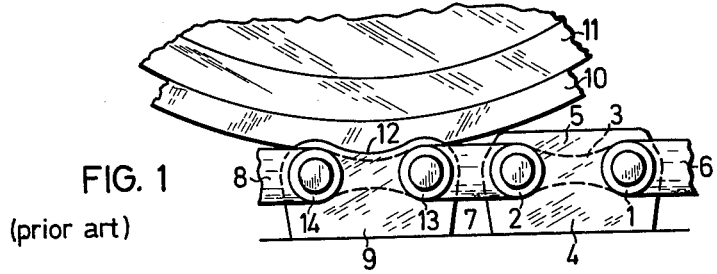
FIGURE 1 represents a diagrammatic side view of a vehicle chain and a portion of a track wheel as heretofore used.

Referring now to the drawings in detail, FIG. 1 shows a prior art arrangement comprising a tubular body composed of two taubular members 1 and 2 extending in a direction transverse to the driving direction. The tubular body is provided with a rubber protrusion or gripping member 4 and with an elastic cover 5 for engagement with the track wheel. The end portions of the tubular members 1 and 2 are rigidly interconnected by spectacle-shaped fish-plates 3. The tubular members 1, 2 serve in a manner known per se for journalling chain bolts which are linked to each other by connecting members 6, 7 and 8. While the right-hand link body 1 to 5 is shown as not being under load, the left-hand link body 9 is under the load of a track wheel 11 provided with a rubber layer 10.

As will be evident from FIG. 1, the rubber layer 12 of link body 9 is considerably depressed between tubular members 13 and 14. Within the range of the tubular members 13, 14, the rubber layer 10 is deeply compressed. It is, therefore, obvious that when a vehicle equipped with the arrangement of FIG. 1 is moving, the rubber layer 10 is always under a non-uniform load and thus is considerably distorted.

Figure 2:
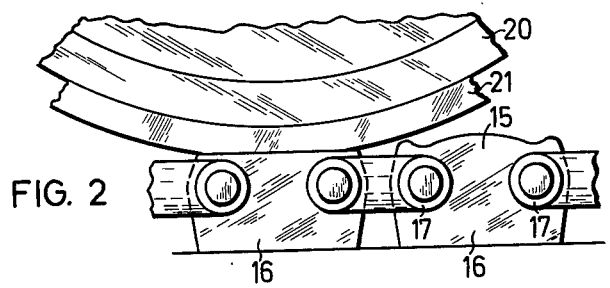
FIGURE 2 is a diagrammatic side view of a vehicle chain with link bodies according to the present invention, one of said link bodies being under load and the other link body being under no load.
Figure 3:
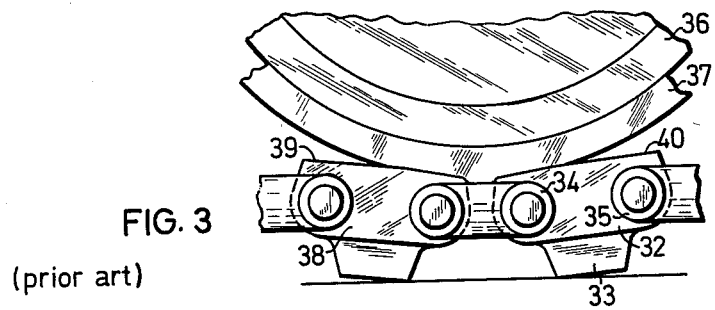
FIGURE 3 is a diagrammatic side view of a vehicle chain with link bodies which have protrusions or gripping members reduced in length in the driving direction and have a profile of a heretofore customary type.

If, however, in conformity with the arrangement according to the present invention as illustrated in FIG. 2, the link body 16 is designed as an elastic gripping member which, when under no load has the contour shown on the right-hand side of FIG. 2, its upper surface of portion 15 will, under load, be substantially plane as shown on the left-hand side of FIG. 2. As will be seen from the right-hand side of FIG. 2, the link body 16 is in conformity with the load to be absorbed, elastically increased in height outside those areas which are reinforced by the tubular members 17. Inasmuch as the running layer 21 of the track wheel, when passing over the link bodies 16 is deformed to a considerably less extent with regard to the prior art arrangement shown in FIG. 1, the load to which the track wheels 20 are subjected may, therefore, be considerably increased. The link body 16 of FIG. 2 is illustrated on an enlarged scale and in an isometric way in FIG. 5. As will be seen from FIG. 5, the link body 16 comprises two tubular members 17 having their two ends interconnected by spectacle-shaped fish-plates 25. The link body 16 is provided with a ground contacting protrusion or gripping member 28 and an upper rubber cover 15. The elastic cover portion 15 for engaging the track wheel is shown also in FIG. 7 with its front and rear sides 15a and 15b provided with elevations 30 and 31, respectively, while the central part of said cover portion 15 which is located between the tubular members 17 is curved somewhat upwardly in conformity with its yieldability under nominal load, so that the said central portion 15, when being rolled over by the track wheel, will assume a substantially plane shape.

In order to increase the grip of rubber-covered chain members, it is known to reduce the length of the running protrusions or grippers in the driving direction. With heretofore known chain links, such an arrangement brings about the drawback that when the track wheels roll over the chain links, the latter are subjected to a tilting stress at the time when the wheel occupies a position between two adjacent chain links, while no solid support is present below the wheel.

In order to prevent the chain links from being subjected to such tilting stresses, the present invention provides that the elastic support of the link chains at the ends where the wheel moves on and from said elastic supports, has its height reduced or is slanted at said portions. An arrangement of this type is shown in FIGS. 3, 4, 6 and 8.

According to the arrangement of FIGS. 1, 2, 5 and 7, the bottom surface 28 of the running protrusions or grippers 16 extend over the entire length of the elastic top cover 15. Such link body, when engaging the ground, is always in flat contract therewith and, therefore, is in a good position fully to absorb the pressure exerted thereupon by the wheel rolling thereover from one end to the other of the link body.

Figure 4:
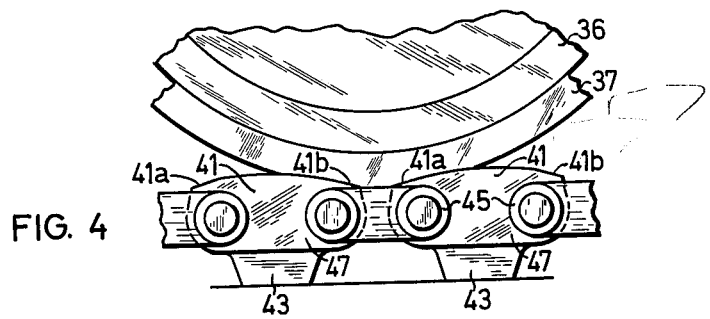
FIGURE 4 is a diagrammatic side view of a vehicle chain with link bodies having their protrusions or gripping members reduced in driving direction and having a modified profile according to the present invention.

With the running protrusions or grippers 33 (FIG. 3), however, the length of the bottom surface 52 (see FIG. 6) has been reduced in the driving direction over the length of the bottom surface 28 of link member 16 and corresponds substantially to the distance between the tubular bodies 34 and 35. When, with such chain links, a wheel 36 provided with an elastic cover or bandage 37 leaves a link body 38 or its plane cover 39 and moves onto the elastic cover 40 of the next following link member 32, it will be appreciated that during this changeover movement, the vertically exerted force acts between the grippers 33—in other words, is not absorbed by a frame support. As a result thereof, the vehicle chain buckles, and the link bodies 32 and 38 tilt. In order to prevent such tilting, the vehicle chain shown in FIG. 4 is, in conformity with a further development of this invention, provided with elastic running protrusions or grippers 43. As will be seen from FIG. 4, the two links 47 have on their ends of the elastic cover surface 41 a moving on side 41a and a running off side 41b (those portions which are not located over the bottom surfaces of the grippers 43) lowered, i.e. inclined toward the ends of the links, whereas the central portion of the elastic covers 41 between the tubular members 45 of the two link bodies 47 are raised. It will thus be appreciated that when the track wheel 36 moves over the two link bodies 47 and their elastic layers 41, the wheel 36 will exert no pressure upon the surfaces 41a and 41b or at best, a pressure which is considerably reduced over the pressure that will be exerted by wheel 36 on the central increased portions 41. In this way, a buckling of the chain and a tilting of the two link members 47 will be avoided. A link body of the just-mentioned type has been shown on an enlarged scale in FIG. 6. As will be seen from FIG. 6, the two tubular members 45 are interconnected by a fish-plate 51. The running protrusion or gripper 43 is reduced in the driving direction over the gripper 28 of FIG. 5 or 7. Above the tubular members 45 there is an elastic layer 41. FIG. 8 is showing the inclined end portions 41a and 41b and the central raised portion 56 of the elastic layer 41. The central portion 56 between the two tubular members 45 is raised approximately to the extent to which the wheel 36 (see FIG. 4) with its cover layer 37, when under normal load, will compress the rubber of section 56.

It is, of course, to be understood that the present invention is, by no means, limited to the particular constructions shown in the drawings, but also comprises any modifications within the scope of the appended claims.

What I claim is:

1. A link body for an endless traction chain for use in connection with track laying vehicles having wheel means for engagement with one surface of said link body, said one surface forming the inner surface of said link body, said link body having its width in a first direction corresponding to the direction in which the link body is to be moved with the chain of which it is intended to form a part and having its length in a second direction transverse to said first direction, said link body comprising: a plurality of tubular means arranged substantially parallel to each other and spaced from each other in said first direction while having their longitudinal extension in said second direction, connecting means interconnecting the end portions of said tubular means to thereby hold said tubular means in spaced relationship to each other, elastic cover means extending between and around said tubular means and forming said inner surface, the central longitudinal portion of said inner surface when not under the load of said wheel means being convexly curved when looking in the direction from said tubular means toward said inner surface, said convexly curved central portion being yieldable under the load of said wheel means so as to assume a substantially flat surface contour.

2. A link body according to claim 1, in which said inner surface has its outer marginal portions in the longitudinal direction of said link body respectively provided with elevations extending over the length of said link body.

3. A link body according to claim 2 in which the outer marginal portions of said inner surface which extend in the longitudinal direction of said link body are located laterally of said convexley curved portion and taper in the direction away from the respective adjacent tubular means.

References Cited by the Examiner

UNITED STATES PATENTS

| | | | |
|---|---|---|---|
| 2,234,927 | 3/1941 | Kubaugh | 305—36 |
| 2,332,976 | 10/1943 | Saurer | 305—36 |

BENJAMIN HERSH, *Primary Examiner.*

R. J. JOHNSON, *Assistant Examiner.*